US009658460B2

United States Patent
Lee et al.

(10) Patent No.: US 9,658,460 B2
(45) Date of Patent: May 23, 2017

(54) HEAD MOUNT DISPLAY DEVICE

(71) Applicant: LG ELECTRONICS INC., Seoul (KR)

(72) Inventors: Minjong Lee, Seoul (KR); Sanghyuk Im, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/073,336

(22) Filed: Mar. 17, 2016

(65) Prior Publication Data

US 2017/0102549 A1    Apr. 13, 2017

(30) Foreign Application Priority Data

Oct. 8, 2015   (KR) .................. 10-2015-0141831
Oct. 15, 2015  (KR) .................. 10-2015-0143805

(51) Int. Cl.
    G02B 27/01    (2006.01)
    G02B 27/00    (2006.01)

(52) U.S. Cl.
    CPC ..... *G02B 27/0179* (2013.01); *G02B 27/0093* (2013.01); *G02B 27/0172* (2013.01); *G02B 27/0176* (2013.01); *G02B 2027/0134* (2013.01); *G02B 2027/0156* (2013.01)

(58) Field of Classification Search
    CPC ............ G02B 27/0179; G02B 27/0093; G02B 27/0172; G02B 27/0176; G02B 27/2228; G02B 2027/0134; G02B 2027/0156; G02B 2027/0178; G02B 2027/0185; G02B 2027/0187; G02B 2027/0132
    See application file for complete search history.

(56) References Cited

U.S. PATENT DOCUMENTS 5,488,952 A * 2/1996 Schoolman ........ A61B 1/00048
                                              128/916
5,739,893 A * 4/1998 Karasawa ............. G09B 9/307
                                              351/158
5,815,126 A * 9/1998 Fan ..................... G02B 27/017
                                              345/7

(Continued)

FOREIGN PATENT DOCUMENTS

JP       6-315122 A      11/1994
KR       10-1419007 B1    7/2014
KR       10-2015-0034895 A 4/2015

*Primary Examiner* — Tom Sheng
(74) *Attorney, Agent, or Firm* — Birch, Stewart, Kolasch & Birch, LLP

(57) ABSTRACT

A head mount display device including a housing comprising a closed, front side and a back side having an opening, a pair of optic modules arranged horizontally and a head fixing unit configured to fix the housing to a user's head is provided. Each of the optic modules includes a display provided in the housing; a barrel comprising one side arranged in the housing and the other side exposed outside the housing via the opening; a lens fixed to the barrel; a focus adjuster configured to adjust a distance between the barrel and the display; and a horizontal adjusting unit configured to guide horizontal movement of the optic module, and the focus adjuster and the horizontal adjusting unit provided in one of the optic modules is operable independently from the focus adjuster and the horizontal adjusting unit provided in the other optic module.

27 Claims, 20 Drawing Sheets

(56) References Cited

U.S. PATENT DOCUMENTS

| | | | | |
|---|---|---|---|---|
| 5,825,340 A * | 10/1998 | Torizuka | G02B 27/017 | 345/8 |
| 5,954,642 A * | 9/1999 | Johnson | G02B 27/017 | 600/300 |
| 6,144,347 A * | 11/2000 | Mizoguchi | G02B 27/0172 | 345/7 |
| 6,421,031 B1 * | 7/2002 | Ronzani | G02B 27/017 | 345/8 |
| 6,747,611 B1 * | 6/2004 | Budd | G02B 27/0172 | 345/7 |
| 2004/0150888 A1 * | 8/2004 | Domjan | G02B 27/0172 | 359/630 |
| 2006/0158731 A1 * | 7/2006 | Eichenlaub | G02B 27/0172 | 359/462 |
| 2009/0322972 A1 * | 12/2009 | Ando | G02B 7/002 | 349/11 |
| 2012/0113092 A1 * | 5/2012 | Bar-Zeev | G02B 27/017 | 345/419 |
| 2012/0200934 A1 * | 8/2012 | Fujishiro | G02B 27/0172 | 359/630 |
| 2014/0153102 A1 * | 6/2014 | Chang | G02B 27/0172 | 359/630 |
| 2014/0362445 A1 * | 12/2014 | Welker | G02B 27/017 | 359/630 |
| 2015/0138645 A1 | 5/2015 | Yoo et al. | | |
| 2015/0227245 A1 * | 8/2015 | Inagaki | G06F 3/0412 | 345/173 |
| 2016/0025990 A1 * | 1/2016 | Zhang | G02B 27/2257 | 359/474 |

\* cited by examiner (a)

(b)

HEAD MOUNT DISPLAY DEVICE

CROSS-REFERENCE TO RELATED APPLICATIONS

This application claims priority to Korean Patent Application No. 10-2015-0141831 filed on Oct. 8, 2015 and No. 10-2015-0143805 filed on Oct. 15, 2015 in Korea, the entire contents of which is hereby incorporated by reference in its entirety.

BACKGROUND OF THE DISCLOSURE

Field of the Disclosure

Embodiments of the present disclosure relate to a head mount display device which may be adjusted according to each user's sight and a distance between each user's pupils.

Background of the Disclosure

With introduction of diverse types of displays, head mount display devices appear recently. A user wears a head mount display device and enjoys video and such devices are referred to as HMD (Head Mount Display). The head mount display needs focusing, because it is located near human eyes.

The virtual reality head mount displays introduced recently provide 3D images, not 2D images. Also, the virtual reality head mount displays provide 360 degree panorama images according to the user's horizontal move and diverse images according to the user's vertical move.

The virtual reality head mount display completely blocks out light around the device and provides different images to right and left eyes, respectively, to realize 3D images. The user needs to take the focal distance to recognize the two different images (specifically, a left eye image and a right eye image) as one 3D image.

When mechanisms such as a motor to take the focal distance sharply are provided in the head mount display, the wearing sensation deteriorates and the focal distance adjusting mechanism having a new simpler structure is required accordingly.

The user wears the head mount display device, after taking off glasses. Users with poor eyesight cannot view images. The eyesight changes when the user wears contact lenses or not. In other words, a different focal distance has to be taken according to each user and even one user has to re-adjust a focal distance according to wearing of contact lenses or not. Each user has a different distance between two eyes (i.e., interpupillary distance) and fails to view clear 3D image, without re-setting focus. In this instance, user might suffer from dizziness.

SUMMARY OF THE DISCLOSURE

Accordingly, an object of the present invention is to address the above-noted and other problems.

An object of the present disclosure is to provide a head mount display device including a head mount display device comprising a focus adjusting unit and a horizontal adjusting unit configured to make a distance between the lenses in concord with an interpupillary distance (hereinafter, IPD).

Embodiments of the present disclosure may provide a head mount display device including a housing comprising a closed front side and a back side having an opening; a pair of optic modules arranged horizontally; and a head fixing unit configured to fix the housing to a user's head, wherein the each of the optic modules includes a display unit provided in the housing; a barrel comprising one side arranged in the housing and the other side exposed outside the housing via the opening; a lens fixed to the barrel; a focus adjusting unit configured to adjust a distance between the barrel and the display unit; and a horizontal adjusting unit configured to guide horizontal movement of the optic module, and the focus adjusting unit and the horizontal adjusting unit provided in one of the optic modules is operable independently from the focus adjusting unit and the horizontal adjusting unit provided in the other optic module.

The optic module may further include a display frame coupled to the back side of the display unit and comprising a barrel accommodating unit configured to surround a circumference of the barrel, and the focus adjusting unit changes the position of the barrel arranged in the barrel accommodating unit.

The focus adjusting unit may include a screw thread formed in the circumference of the barrel; and a screw groove formed in the barrel accommodating unit, corresponding to the screw thread.

The head mount display device may further include a friction groove formed in the other circumference of the barrel.

The horizontal adjusting unit may include a coupling portion formed in the optic module and comprising a fixing hole; and a slide shaft extended horizontally through the fixing hole and comprising both ends coupled to the housing, and when the user moves the optic module horizontally, the coupling portion moves along the slide shaft.

The coupling portion may include a first coupling portion arranged in a top of the optic module; and a second coupling portion arranged in a top of the other optic module, and a first fixing hole formed in the first coupling portion is equal to the cross section of the slide shaft, and a second fixing hole formed in the second coupling portion is longer than the cross section of the slide shaft.

The coupling portion may further include a friction member configured to enhance contact friction with respect to the slide shaft.

The opening formed in the housing may be horizontally longer than the barrel.

The focus adjusting unit may include a screw having one side rotatably fixed to one of the display frame and the barrel and inserted in a screw groove formed in the other one, the screw comprising a screw thread formed in an outer surface; and a wheel coupled to an outer circumference of the screw When the rotating the wheel about the screw, the screw may be movable inward and outward with respect to the screw hole and the position of the barrel is adjusted.

The head mount display device may further include a magnet arranged adjacent to the screw, wherein the screw comprises metal.

The head mount display device may further include a first guide hole formed in the barrel; a second guide hole formed in the display frame; and a guide shaft penetrating the first guide hole and the second guide hole and parallel to the screw, wherein the first guide hole or the second guide hole moves along the guide shaft when the barrel moves.

The first guide hole may be arranged closer to the front side of the housing than the second guide hole.

The horizontal adjusting unit may include a rail fixed to the housing and extended horizontally, and the optic module may be inserted in the rail and moves horizontally when the horizontal adjusting unit is moved horizontally.

The head mount display device may further include a magnet provided in the optic module and arranged adjacent to the rail, wherein the rail comprises metal.

The focus adjusting unit may include a screw having one side fixed to one of the display frame and the barrel and inserted in a screw groove formed in the other one, the screw comprising a screw thread formed in an outer surface; and a wheel coupled to an outer circumference of the screw, and when the rotating the wheel about the screw, the screw is movable inward and outward with respect to the screw hole and the position of the barrel is adjusted.

The horizontal adjusting unit may include a button exposed outside; and a coupling hole coupled to the optic module via a button opening formed in the housing, and the button opening is extended horizontally.

The horizontal adjusting button may include a wheel opening exposing one side of the wheel outside.

The opening formed in the housing is horizontally longer than the size of the barrel.

The head mount display device may further include a pair of spacers coupled to right and left sides of the barrel, respectively, and equal to or longer than a diameter of the barrel and a difference between the right and left lengths of the opening.

Embodiments of the present disclosure may provide a head mount display device including a housing comprising a closed front side and a back side having an opening; a pair of optic modules arranged horizontally; a main board provided between the optic modules and configured to receive an image signal from an external device to provide the image signal to the display unit; and a head fixing unit configured to fix the housing to a user's head.

Each of the optic modules includes a display unit provided in the housing; a display drive unit coupled to one end of the display unit and configured to control pixels of the display unit according to the signal transmitted from the main board; and a connecting portion configured to connect the main board and the display unit to each other; a barrel comprising one side arranged in the housing and the other side exposed outside the housing via the opening; a lens fixed to the barrel.

A display drive unit of the left eye optic module and a display drive unit of the right eye optic module may be arranged in symmetry.

The connecting portion may be arranged in a center of the main board in a vertical direction.

The connecting portion may include a flexible material.

The head mount display device may further include an interface unit formed in a predetermined portion of the housing or the head fixing unit and connected to an external terminal; and a flexible board configured to connect the interface unit to the main board.

The head mount display device may further include a wireless communication unit configured to transmit and receive image data and sound data to and from an external device in a wireless manner.

The head fixing unit may further include an eyeglass temple unit coupled to right and left ends of the housing to be wearable on the user's ear The head fixing unit may further include a cushion arranged in an inner surface of the eyeglass temple unit.

The head mount display device may further include a hood unit provided between the housing and the user's face and configured to shut off external light.

The head mount display device may further include a proximity sensor arranged in a center of a back side of the housing, wherein the controller activates a screen of the display unit when sensing an object coming close to the proximity sensor.

The head mount display device may further include a gyro sensor configured to sense variation of the housing direction; a hold button exposed outside the housing; and a main board configured to control the display unit to output a different image according to the direction sensed by the gyro sensor and not to change the image even with the changed direction sensed by the gyro sensor, when a hold signal is generated from the hold button.

The head mount display device may further include a nose pad projected between the pair of the optic modules to be placed on the user's nose, wherein the nose pad has a V-shape for covering a top and both sides of the nose.

According to at least one embodiment mentioned above, the focus distance may be adjusted according to the user's eyesight. The horizontal adjusting unit is provided to make the distance between the lenses in concord with IPD (Interpupillary Distance). The user may enjoy 3D image more comfortably.

Especially, the left eye optic module and the right eye optic module may be independently controlled in the head mount display device in accordance with the present disclosure. Even the user with different right eye sight and left eye sight may adjust the focus and the distance between the eyes and the nose.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such terms herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
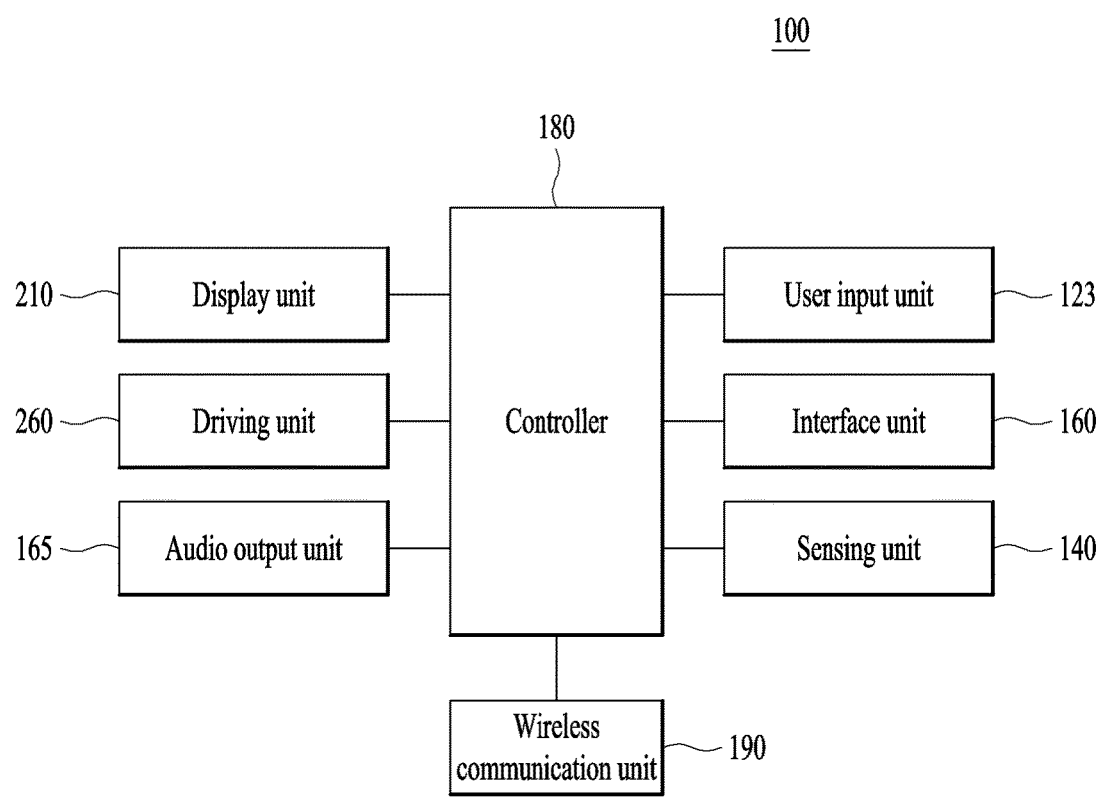
FIG. 1 is a block diagram to describe a head mount display device in accordance with the present disclosure.

FIG. 1 is a block diagram to describe a head mount display device 100 in accordance with the present disclosure. The head mount display device 100 in accordance with the present disclosure includes a display unit 210, an audio output unit 165, a driving unit 260, a user input unit 123, an interface unit 160, a sensing unit 140, a controller 180 and a wireless communication unit 190.

The display unit 210 is configured to output image information from an image output module provided in one surface and it is provided in each of left and right eye parts of the head mount display device 100. The display unit 210 provides images to the left or right eyes. The display unit 210 may provide the right and left images with identical images or the two images taken at different angles, respectively, to realize the 3D image.

The display unit 210 may include one or more of a liquid crystal display (LCD), a thin film transistor-liquid crystal display (TFT LCD), an organic light-emitting diode (OLED), a flexible display, a 3D display and an e-ink display.

The display unit 210 may further include a lens 250 arranged between the image output unit and the user's eyes and configured to adjust a focal distance of the image output from the display unit 210.

The driving unit 260 is configured to adjust the location of the display unit 210 according to the distance between the user's right and left eyes and control the location of the lens 250 arranged in front of the display unit according to the user's eyesight. The driving unit 260 includes a horizontal adjusting unit 223, 265 and 267 configured to adjust the distance between the right and left eyes and a focus adjusting unit 227 and 247 configured to adjust the distance between the lens 250 and the display unit 210 according to the sights of the left and right eyes.

The audio output unit 165 may include a bone conductive speaker to deliver sound to the user's skull directly or an ear jack to deliver sound to the user through an earphone.

The user input unit 123 is configured to receive information input from the user. When the user inputs information through the user input unit 123, the controller 180 may control the operation of the head mount display 100, corresponding to the input information.

Such the user input unit 123 may include mechanical input means (or a mechanical key, e.g., a button, a dome switch, a jog wheel and the like which are arranged in a front, rear or lateral surface of the head mount display device 100) and touch input means. The user input unit 123 described in the embodiment shown in FIG. 2 may be provided as a button type 123a and 123b having a dome switch in a state of being exposed to a lateral surface of the housing 110.

The interface unit 160 may be a passage for connecting the head mount display device 100 to an external device. For example, the interface unit 160 may be provided with an image signal or the electric power from the external device. When the head mount display device 100 which is a wearable device on the human face includes a battery, the overall weight of the head mount display device 100 happens to increase disadvantageously. Accordingly, the head mount display device 100 may be provided with the external electric power through the interface unit 160.

The sensing unit 140 may include proximity sensor (143, see FIG. 3) configured to sense whether the user is wearing the head mount display device 100 or not. Once the proximity sensor 143 sense the user's wearing of the head mount display device 100, the display unit 210 may be converted to be in an activated state.

The sensing unit 140 may also include a touch sensor, an acceleration sensor, a magnetic sensor, a G-sensor, a gyroscope sensor, a motion sensor, a RGB sensor, an IR sensor, a finger scan sensor, an ultrasonic sensor and the like.

The wireless communication unit 185 performs wireless communication with an external terminal and receives image information from the external terminal. The wireless communication unit 185 implements the wireless communication in a near field with the external terminal arranged not so far and it uses short range communication. Accordingly, the wireless communication unit 185 may support short range communication, using one or more of Bluetooth™, Radio Frequency Identification (RFID), IrDA (Infrared Data Association), Ultra Wideband (UWB), ZigBee, Near Field Communication (NFC), Wireless Fidelity (Wi-Fi), Wi-Fi Direct and Wireless Universal Serial Bus (Wireless USB) technology.

The controller 180 is connected to the display unit 210, the wireless communication unit 190, the sensing unit 140, the interface unit 160 and the user input unit 123, to control the head mount display device 100. The controller 180 controls the display unit to output images based on the image data transmitted through the wireless communication or the interface unit 160. In addition, the controller 180 may activate the display unit 210 of the head mount display device 100 based on the sensing result of the sensing unit 140.

The screen of the display unit 210 may be controlled according to the user's command signal input from the user input unit 123. In this instance, an external terminal may be controlled through the interface unit 160 and the wireless communication unit.

Figure 2:
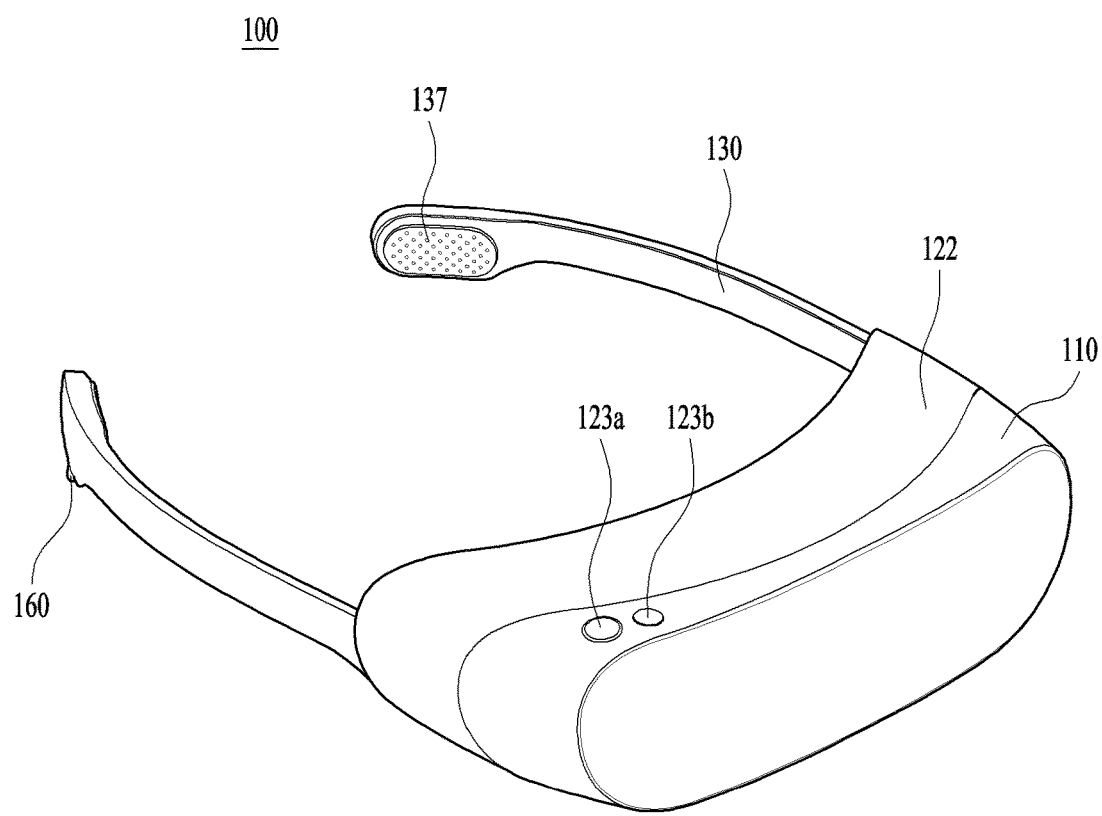
FIGS. 2 and 3 are perspective diagrams of one example of the head mount display device, viewed in different directions.
Figure 3:
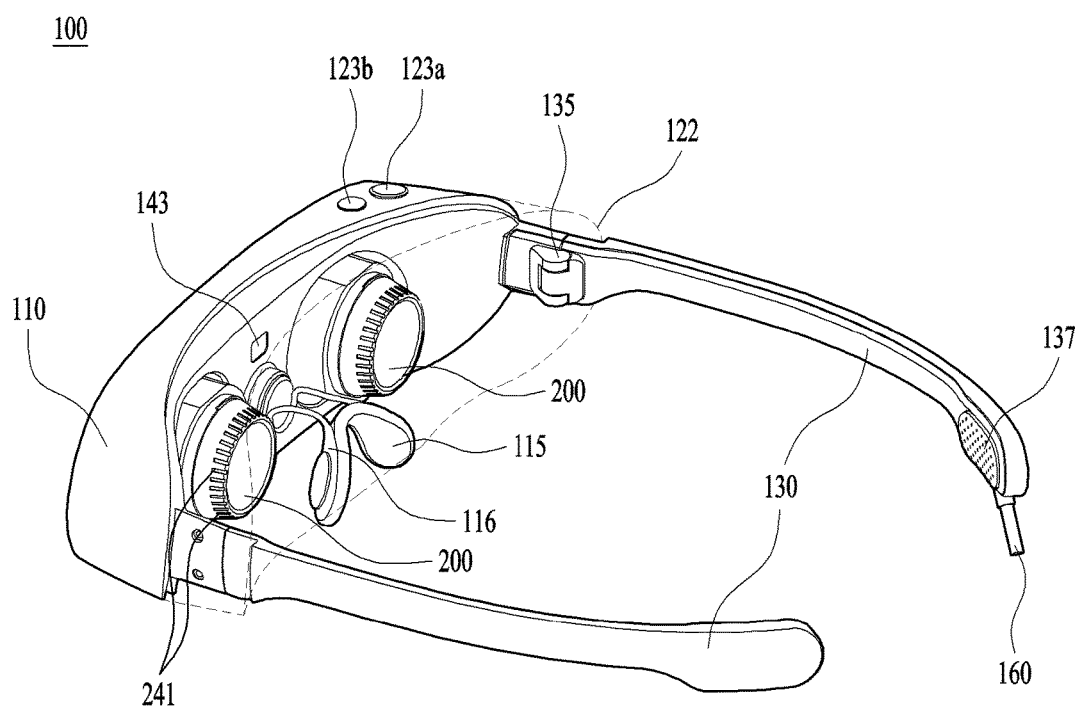
Figure 4:
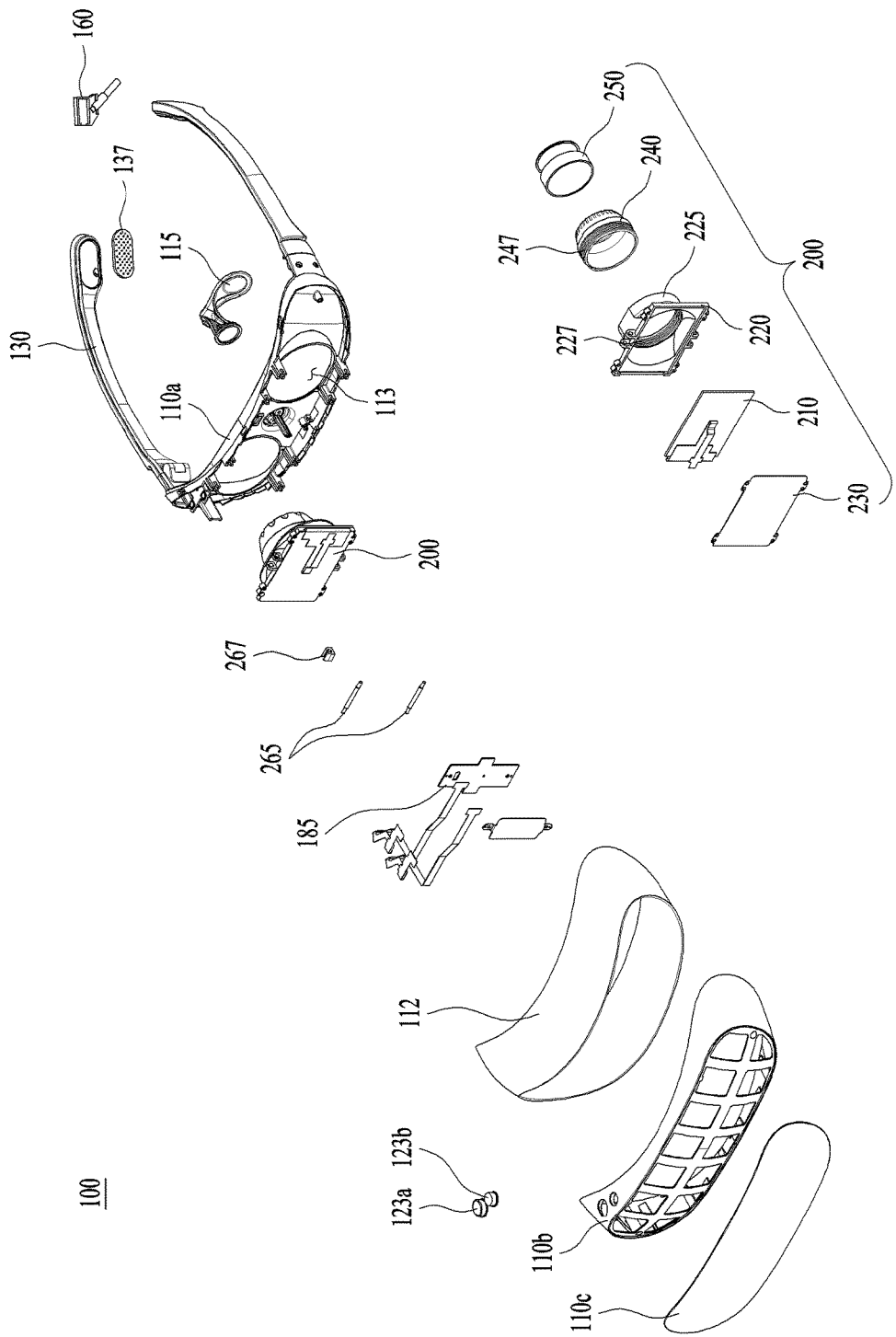
FIG. 4 is an exploded perspective diagram of the head mount display device.

FIGS. 2 and 3 are perspective diagrams of the head mount display device 100, viewed in different sides. FIG. 4 is an exploded perspective diagram of the head mount display device 100. Referring to FIG. 4, includes a housing 110, a head fixing unit 130 configured to fix the housing 100 to the user's head and a pair of optic modules 200 configured to provide images to the user's right and left eyes, respectively.

The housing 110 may be provided in front of the user's eyes and a front side of the housing 110 may be flat or curved. However, a rear surface of the housing 110 may be curved corresponding to the user's face shape. The housing 100 may have a similar shape to goggles. The front side of the housing 110 is closed and the rear surface of the housing 110 has an opening 113, so that the optic module 200 may be inserted in the opening 113.

The housing 110 may include a first case arranged near the user's eyes and in which diverse components are mounted, a second case coupled to the first case to define a lateral surface of the housing 110, and a third case provided in the front side of the housing 110. The second case may be integrally formed with the first case or the third case. In this embodiment, the second case includes a grid frame configured to support the first case.

The first case, the second case and the third case of the housing 110 may be injection-molded, using synthetic resin or metal, e.g., stainless steel (STS) and aluminum (Al), titanium (Ti). One material or different materials may be used in forming the cases.

A pair of openings may be formed in the first case and a pair of optic modules 200 may be exposed via the pair of the openings. The first case may further include a nose pad to fix the housing 110 corresponding to the location of the user's eyes. A conventional nose pad 116 supports both sides of the user's nose. However, the nose pad of the embodiment has a V-shape surrounding sides and a top of the nose to disperse the weight applied to the user's nose. The nose pad 115 may be formed of a flexible material to reduce the load applied to the nose.

The head fixing unit configured to fix the housing 110 to the user's head may be a band type with elasticity or eyeglass temple unit 130 shown in FIGS. 2 and 3. The eyeglass temple unit 130 is formed of a rigid material and a hinge 135 is provided to enhance the portability.

The user's ears are located under the eyeglass temple units 130, only to prevent the head mount display device 100 from falling down. The housing 110 has a predetermined weight and the eyeglass temple unit 130 may be formed to surround the back of the user's head to secure the housing 110 to the head firmly. The eyeglass temple unit 130 may include a cushion 137 with elasticity provided in an inner surface of the eyeglass temple unit. The cushion 137 is in close contact with the head and configured to improve the frictional force and to reduce the inconvenience given to the user during the wearing.

The eyeglass temple unit 130 is formed of a material with high elasticity, so that the user can widen the eyeglass temple units when trying to wear the head mount display device 100. Both ends of the eyeglass temple units 130 are connected to surround the head so that the housing 110 may have a band shape.

The interface unit 160 is configured to connect the head mount display device to an external terminal to transmit and receive a signal or to supply the electric power. The interface unit 160 may be provided in an end of the eyeglass temple unit 130. If the interface unit 160 is provided in the housing 110, the cable connected to the interface unit 160 could touch the face and the user could feel uncomfortable. Also, the interface unit 160 may be provided in the eyeglass temple unit to prevent the head mount display device from lurching forward.

As shown in FIG. 4, the optic module 200 includes a display unit 210, a display frame 220, barrel 240 and a lens 250. The display unit 210 outputs the image supplied to the user's eye. The two independent optic modules 200 are provided. The optic module 200 provided in a left portion provides an image for the left eye and the other optic module 200 provided in a right portion provides an image for the right eye, so that the 3D image can be realized, even without a complicated polarization structure or a barrier.

The display frame 220 may include a display plate 230 arranged behind the display and coupled to the display unit 210, to improve the force for supporting the display 210. The display unit 210 may be fixedly disposed between the display frame 220 and the display plate 230.

The display plate 230 supports the back side of the display unit 210 and it has a flat shape. The display frame 220 supports the display unit 210 and fix the lens 250 at the same time. Accordingly, the display frame 220 includes a barrel accommodating part 225 formed in a cylindrical shape.

Figure 5:
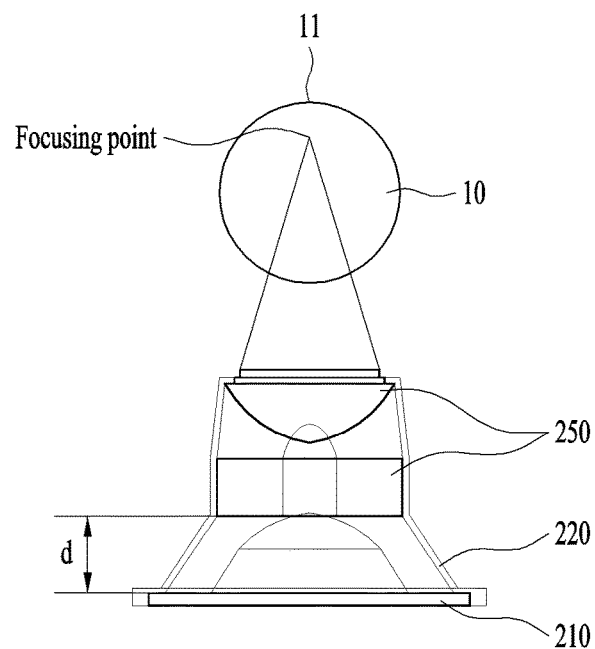
FIG. 5 is a diagram illustrating a state where the head mount display device is worn on the head.

The barrel 240 is formed of a cylindrical-shaped material and receives at least one lens 250. The barrel 240 has a predetermined portion inserted in the barrel accommodating part 225 of the display frame and the other portion exposed via an opening 113 provided in the rear surface of the housing 110. FIG. 5 is a diagram illustrating a state where the head mount display device 100 is worn on the head. The distance between the display unit 210 and the user's eyes is substantially short and the lens 250 is configured to adjust the location of the image output from the display unit 210 to be in a focal distance. As each user has different eyesight, each focal distance for each user is different. When the user is short-sighted, the image is becomes focused in front of the retina. In this instance, the focal distance has to be increased enough to focus the image on the retina so that the user can view the clear image.

When the distance between the lens 250 and the display unit 210 is adjusted, the focal distance can be changed and the location of the display unit 210 is changed in the conventional head mount display device 100. However, the head mount display device 100 in accordance with the embodiments of the present disclosure adjust the distance between the lens 250 and the display unit 210, using the focus adjusting unit 227 and 247.

Figure 6:
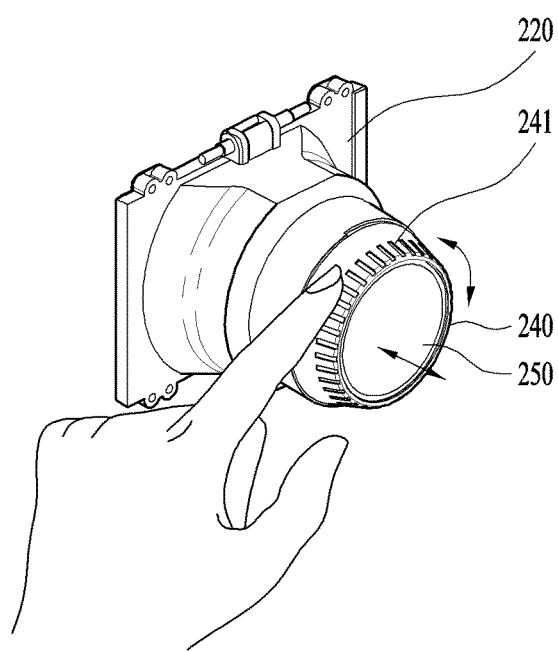
FIG. 6 is a diagram illustrating a method for adjusting a focus of the head mount display device.

FIG. 6 is a diagram illustrating a method for adjusting the focus of the head mount display device 100. The focus adjusting unit 227 and 247 includes a screw thread 247 formed around the barrel 240 and a screw groove formed in the barrel accommodating part 225 of the display frame 220, corresponding to the screw thread 247. In other words, when the barrel 240 is rotated, the screw thread 247 is moving along the screw groove 227 and the barrel 240 is relatively moving with respect to the display frame 220. In case an auxiliary drive member is provided, the overall volume might become large. In contrast, the structure using the screw thread 247 and the screw groove 227 has little increase of the volume and requires no auxiliary member. Accordingly, the structure may be simply realized and the production cost may be reduced.

A friction groove 241 may be formed in the other side of the barrel 240 exposed outside the housing 110 to enhance the friction force so that the user can hold and turn the barrel 240 easily. A plurality of friction grooves 241 may be provided from the outer surface of the barrel 240 as a hemisphere-shaped projection. The friction grooves 241 are provided to enhance only the friction force in the circumferential direction of the barrel 240. Accordingly, the grooves extended in a perpendicular direction with respect to the circumferential direction of the barrel 240 as shown in FIG. 7.

The sight of the left eye is different from the sight of the right eye and the lenses 250 for the eyes are adjusted to have different focal distances, respectively. Although any user uses the head mount display device 100, the head mount display device 100 may provide him or her with clear images.

Figure 7:
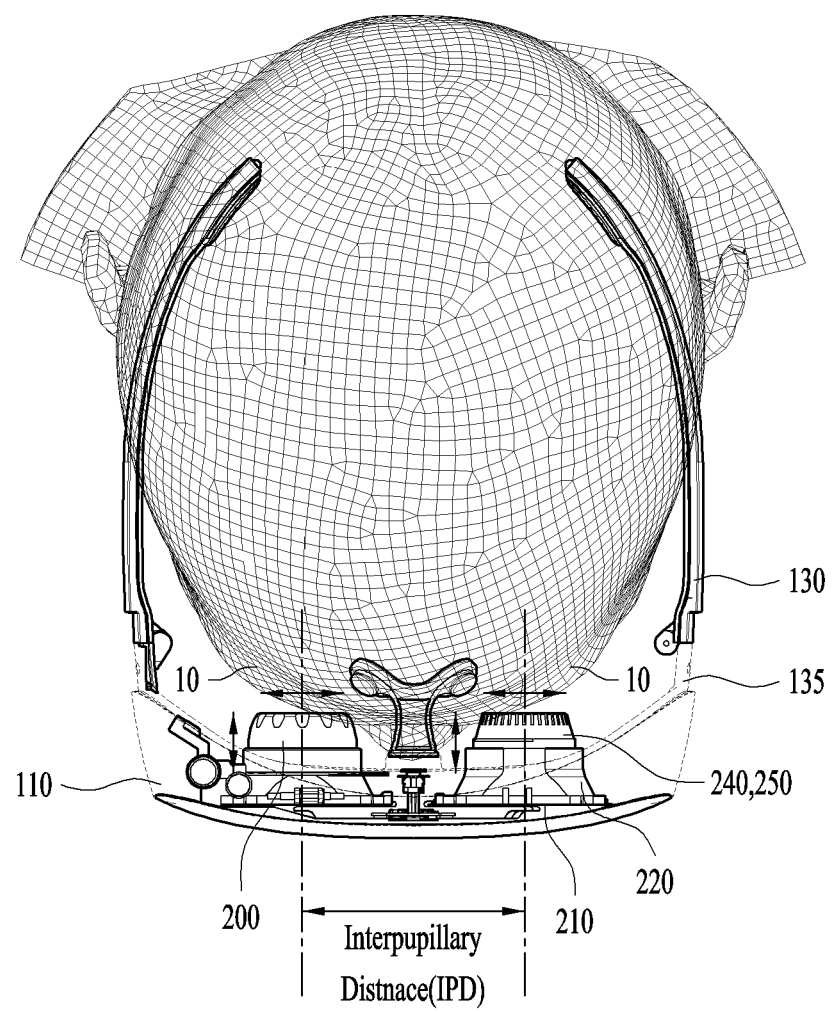
FIG. 7 is a diagram illustrating a principle of focus adjustment for the head mount display device.

FIG. 7 is a diagram illustrating a principle of focus adjustment for the head mount display device 100. The distance between the two optic modules 200 has to be adjusted according to the distance between the eyes, in other words, interpupillary distance (hereinafter, IPD) as well as the focal distance between the device and the user's eyes. To realize the 3D image, the images photographed by two different cameras are provided to the left eye and the right eye, respectively, to allow the user to recognize the images dimensionally. Accordingly, the positions of the pupils have to be in concordance with the center of the image sharply to provide the 3D image.

It is necessary to provide a horizontal adjusting unit which adjust the distance between the optic modules 200, corresponding to the user's pupils. The distance to the left eye from the user's nose is different from the distance to the right eye, the horizontal adjusting unit moving the left and right optic modules 200 independently may locate the optic modules 200 in concordance with the pupils precisely, compared with the horizontal adjusting unit moving the left and right optic modules 200 symmetrically. The lenses 250 and the display units 210 of the optic module 200 in accordance with the present disclosure are divided for the left eye and the right eye, respectively, and they may move independently. Accordingly, the optic modules 200 may be arranged in concordance with the pupils.

Figure 8:
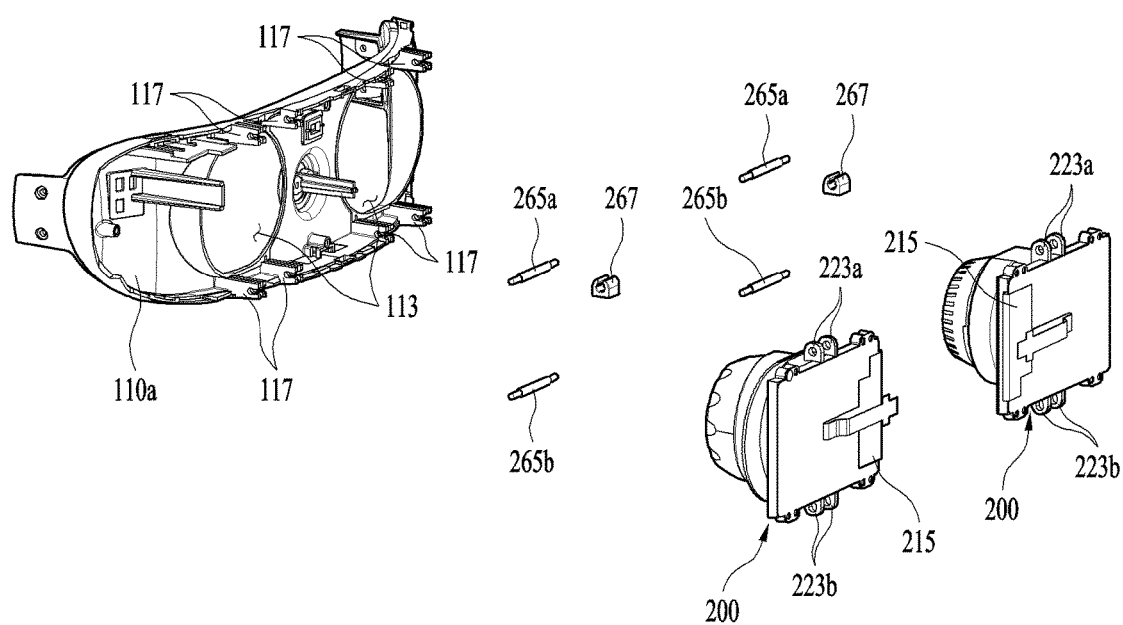
FIG. 8 is an exploded perspective diagram illustrating an optic module, a housing and a horizontal adjusting unit which are provided in the head mount display device.

FIG. 8 is an exploded perspective diagram illustrating the optic module 200, the housing 110 and the horizontal adjusting unit which are provided in the head mount display device 100. The first case 110a and the optic module are coupled to each other through a slide shaft 265. The slide shaft 265 is a shaft extended in a horizontal direction and the optic module 200 is movable along the slide shaft 265 in a right and left direction. Both ends of the slide shaft 265 are fixed to the first case 110a and the optic module 200 includes a coupling portion 223 having a fixing hole 224 through which the slide shaft 265 passes.

Two coupling portions 223 are arranged and one slide shaft 265 passes through each of the coupling portions 223. When moving along the slide shaft 265 horizontally, the optic module 200 may be prevented from tilting in a horizontal direction with respect to the display unit 210. One coupling portion 223 may be provided in a top or bottom of the optic module 200. Preferably, a first coupling portion 223a provided in the top and a second coupling portion 223b provided in the bottom may be provided to fix the slide shaft more stably as shown in FIG. 8.

In case of providing only the first coupling portion 223a, the optic module might be shaky with respect to the slide shaft 265 (in other words, tilting in a vertical direction with respect to the display unit). However, in case of provided the first and second coupling portions 223a and 223b in the top and the bottom, respectively, the vertical tilting of the optic module 200 with respect to the display unit 210 may be prevented.

Figure 9:
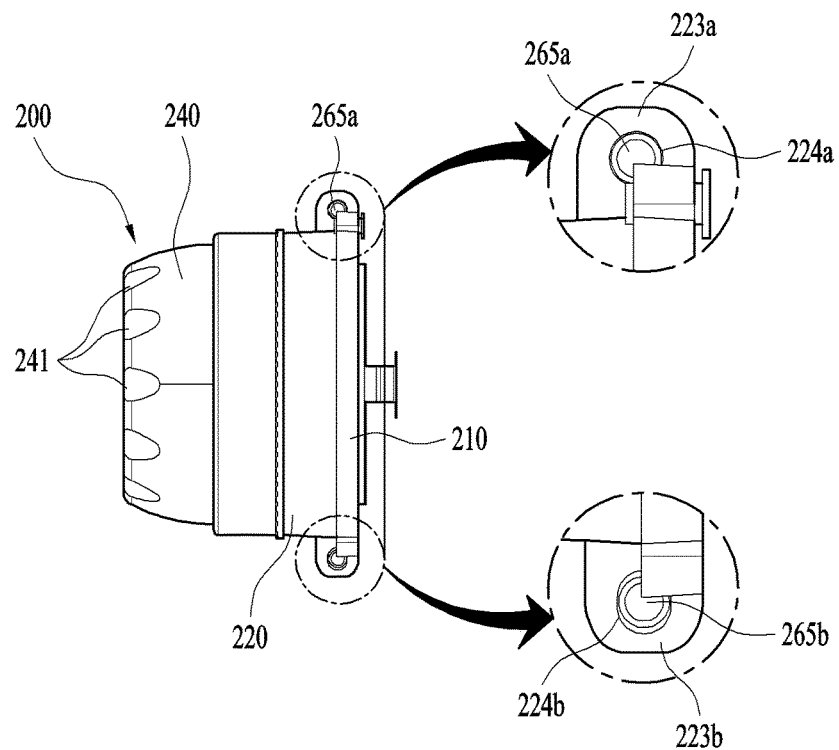
FIGS. 9 and 10 are diagrams to describe the operation of the horizontal adjusting unit provided in the head mount display device.

FIG. 9 is a diagram of the horizontal adjusting unit provided in the head mount display device 100, viewed from a side. The shape of the fixing hole formed in the upper coupling portion 223a is different from the shape of the fixing hole formed in the lower coupling portion 223b. The fixing hole 224a of the upper coupling portion 223a is corresponding to the cross section of the slide shaft 265 and the fixing hole 224b of the lower coupling portion 223b is vertically longer than the cross section of the slide shaft 265. When an tolerance is generated in the vertical position of the slide shaft 265, it is difficult to couple the slide shaft to the optic module. Considering such a tolerance, the lower fixing hole 224 may be vertically long. In other words, the upper coupling portion 223a may control the vertical shaking and the lower coupling portion 223b may restrict the horizontal tilting of the display unit 210.

Figure 10:
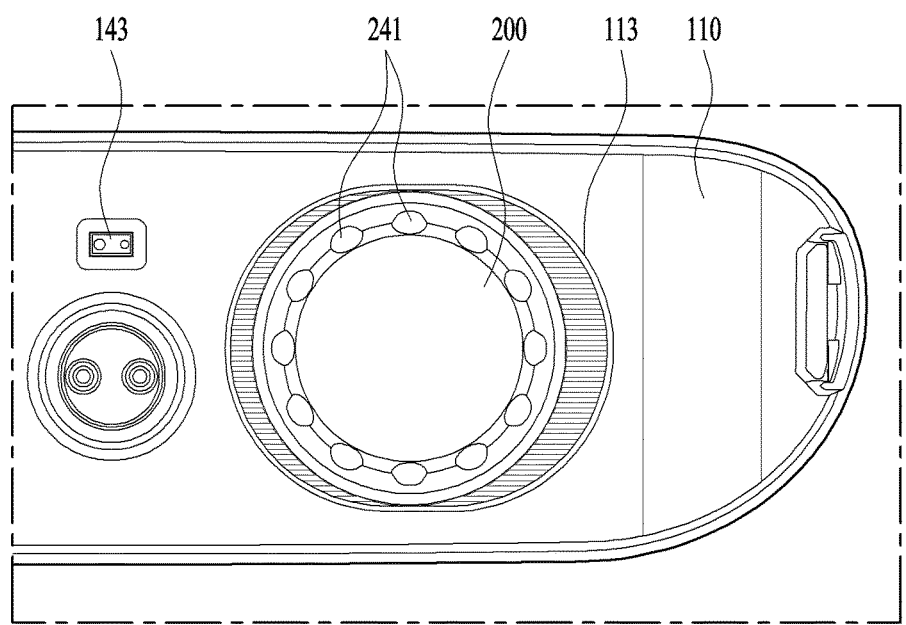

FIG. 10 is a diagram of the head mount display device 100, viewed from the back. The opening 113 may be formed larger than the barrel 240 in a right-and-left direction to prevent the optic module 200 from being interfered in by the housing 110 when moving horizontally, so that the space in which the optic module 200 moves may be provided.

Figure 11:
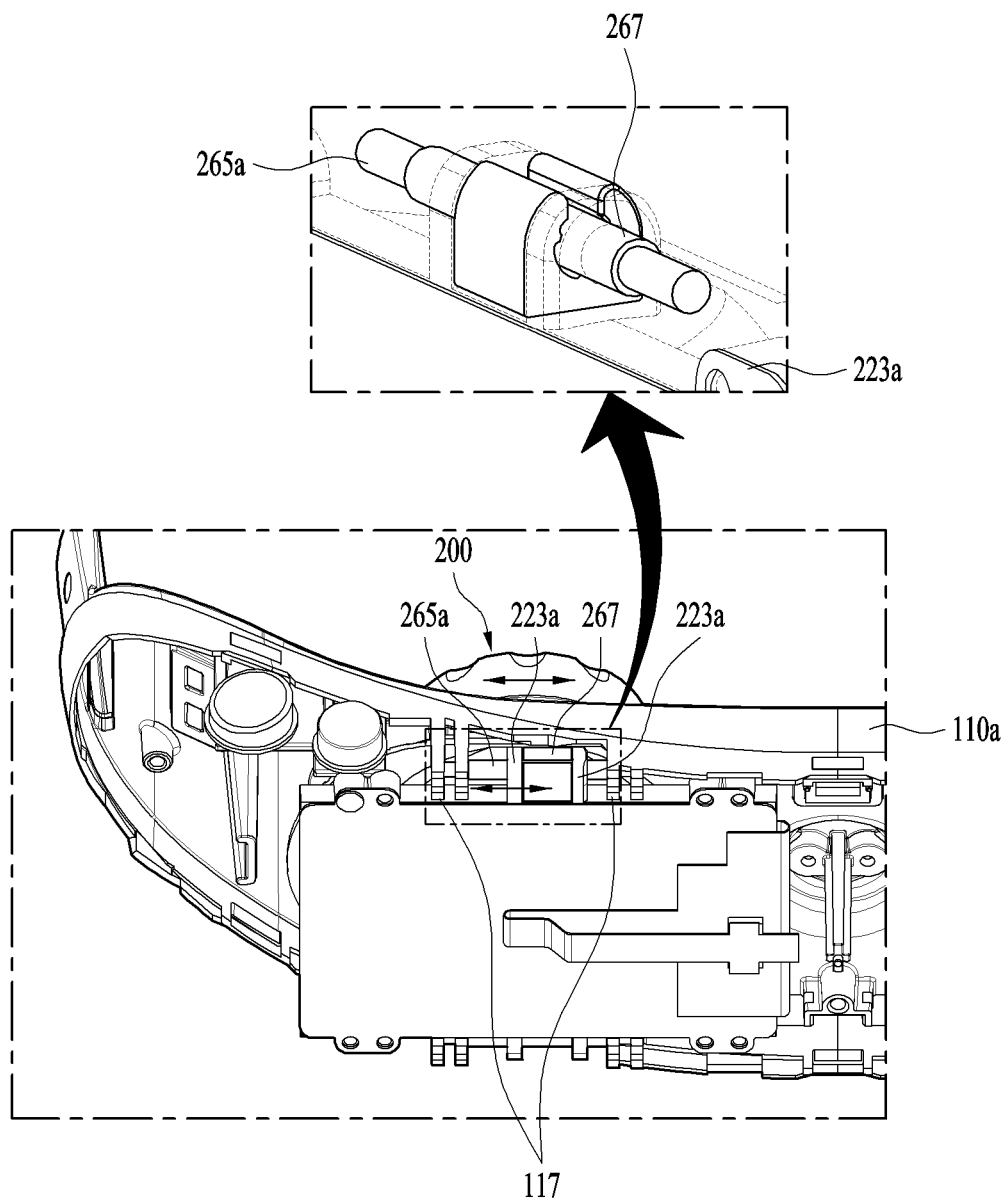
FIG. 11 is a diagram of the horizontal adjusting unit provided in the head mount display device, viewed in a side.

After moving the optic modules 200 to be in concord with the user's pupils, the friction force between the slide shaft 265 and the display frame 220 may be enhanced to secure the optic module 200 to the corresponding positions of the optic modules 200. FIG. 11 is a diagram to describe the operation of the horizontal adjusting unit provided in the head mount display device. A friction member 267 is disposed between the coupling portions 223 arranged in the horizontal direction to enhance the coupling force, so that the friction with respect to the slide shaft 265 can be enhanced.

The friction member 267 may be formed of Poly Oxy Methylene (POM). POM has a high tensile strength, a good fatigue resistance, a good hygroscopicity and a good weather resistance. Accordingly, the friction member 267 may enhance the friction force with respect to the slide shaft 265 and the durability, with no fast abrasion. In addition, the friction member 267 has an embossed portion formed in an inner surface in contact with the slide shaft 265, rather than the material.

The friction member 267 may not be provided in the lower coupling portion 223 so that the user may move the lower coupling portion, using a predetermined force. As mentioned above, the lower coupling portion 223 is configured to prevent the vertical tiling of the display unit 210. If the friction member 267 is provided in the lower coupling portion 223 in case a tolerance is generated, it could be difficult to perform the coupling process.

Figure 12:
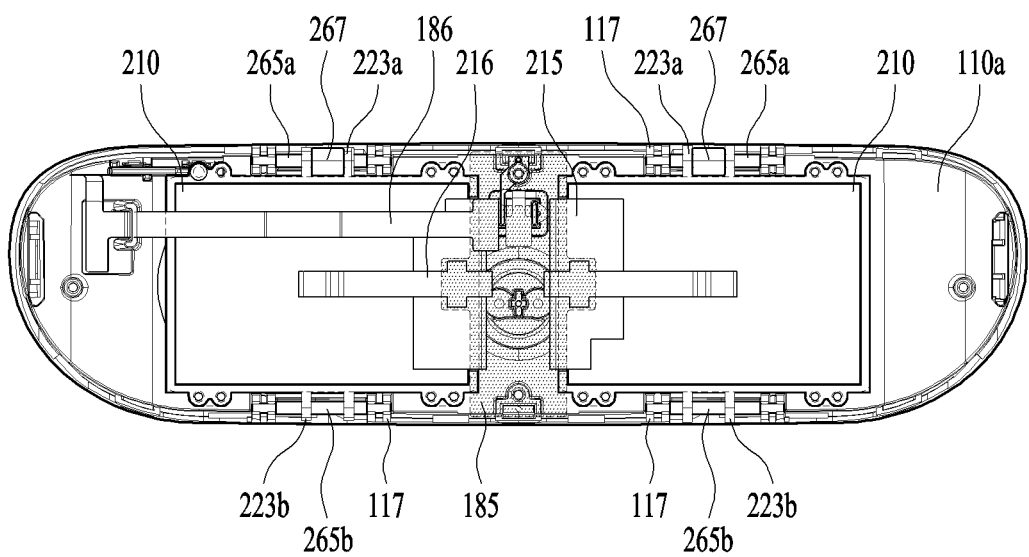
FIG. 12 is a diagram illustrating a connection state between a display unit and a main board in the head mount display device.

FIG. 12 is a diagram illustrating a connection state between the display unit 210a and 210b and the main board 185 in the head mount display device 100. The optic module in accordance with the present disclosure uses independent display units 210 and 210b, so that the display units 210a and 210b has to be in sync. When the left eye display unit 210a and the right eye display unit 210b have the same standard requirements, it may be easy to make the display units in sync and the number of production lines can be reduced.

Each of the display units 210a and 210b includes a display driving unit 215 configured to control pixels of the display units. The display driving unit 215 is connected to the main board 185 and receives data information from the main board 185. The display driving unit 185 controls hue, lightness and saturation of the pixels based on the data information. When the main board 185 is slanted rightward or leftward, the distance to one display unit 210a might be different from the distance to the other display unit 210b from the main board 185 and such difference might be a problem.

The main board 185 is provided between the two display units 210a and 210b for efficiency arrangement. The term of "between" is used. However, the main board 185 may not be plane with the display units and it may be partially overlapped with the display units 210a and 210b as shown in FIG. 12. The main board 185 may be arranged closer to the front side of the housing 110 than the display units 210a and 210b.

When the main board is arranged in the center of the two display units, the center portion is the plane portion of the housing 110 in the head mount display device 100 and identically close to the display units 210a and 210b. Accordingly, the length of the connecting portion for connecting the display driving units 215 with the main board 185 may be short. A flexible display of which a bending point is variable may be used as the connecting portion of the display unit to prevent the optic module 200 from damaging when the optic module 200 is moving.

The display units 210 and 210b for the left eye and the right eye in accordance with the present disclosure may be arranged in point symmetry. In other words, the left eye display unit 210a is arranged in the position of the right eye display unit 210b rotated 180 degrees.

As the main board 185 is arranged in the center of the housing 110, a signal line 186 may be further provided and the signal line 186 is connected to the eyeglass temple unit 130 to connect the main board 185 to the interface unit 160 provided in the eyeglass temple unit 130.

Figure 13:
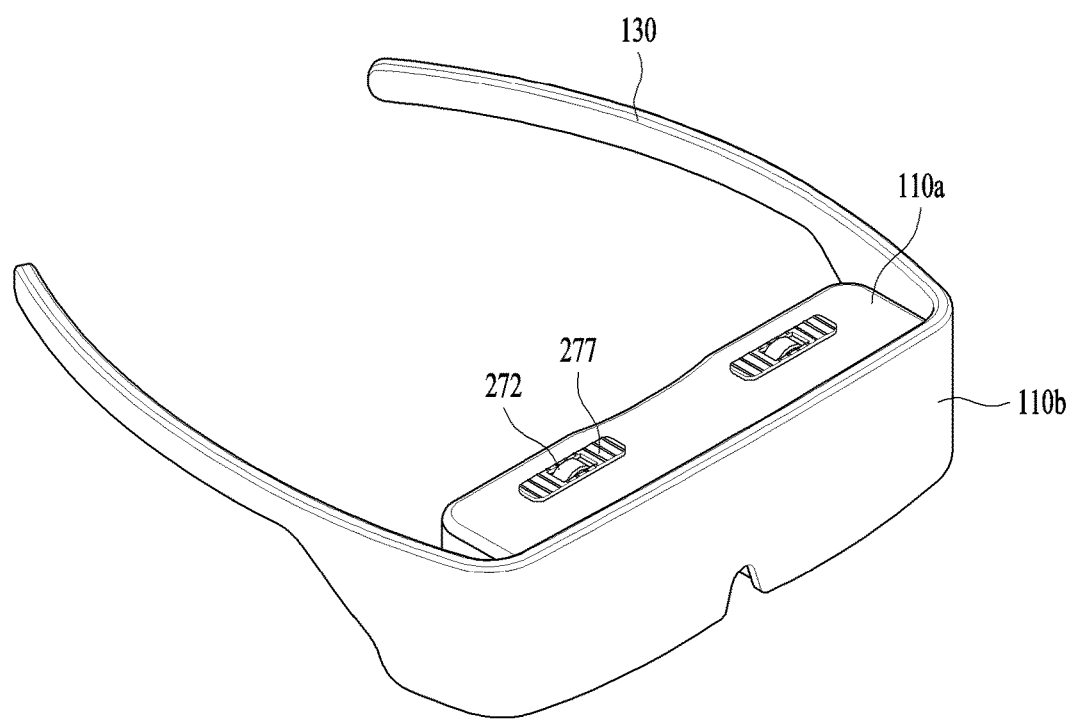
FIGS. 13 and 14 are perspective diagrams of another example of the head mount display device 100, viewed from different directions.
Figure 14:
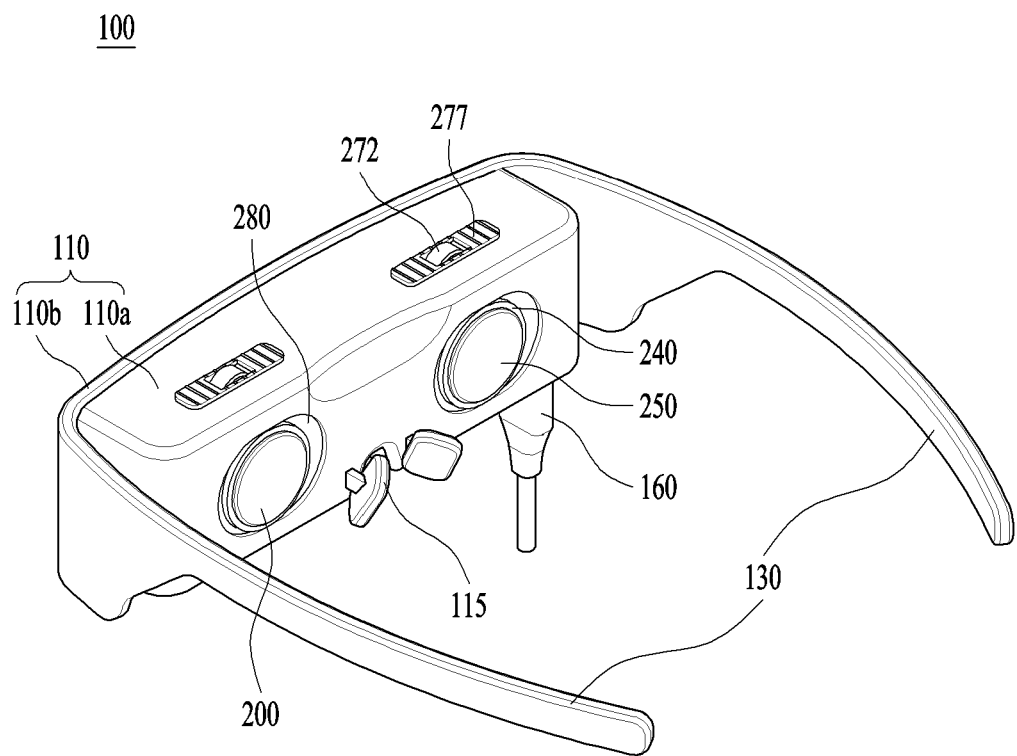
Figure 15:
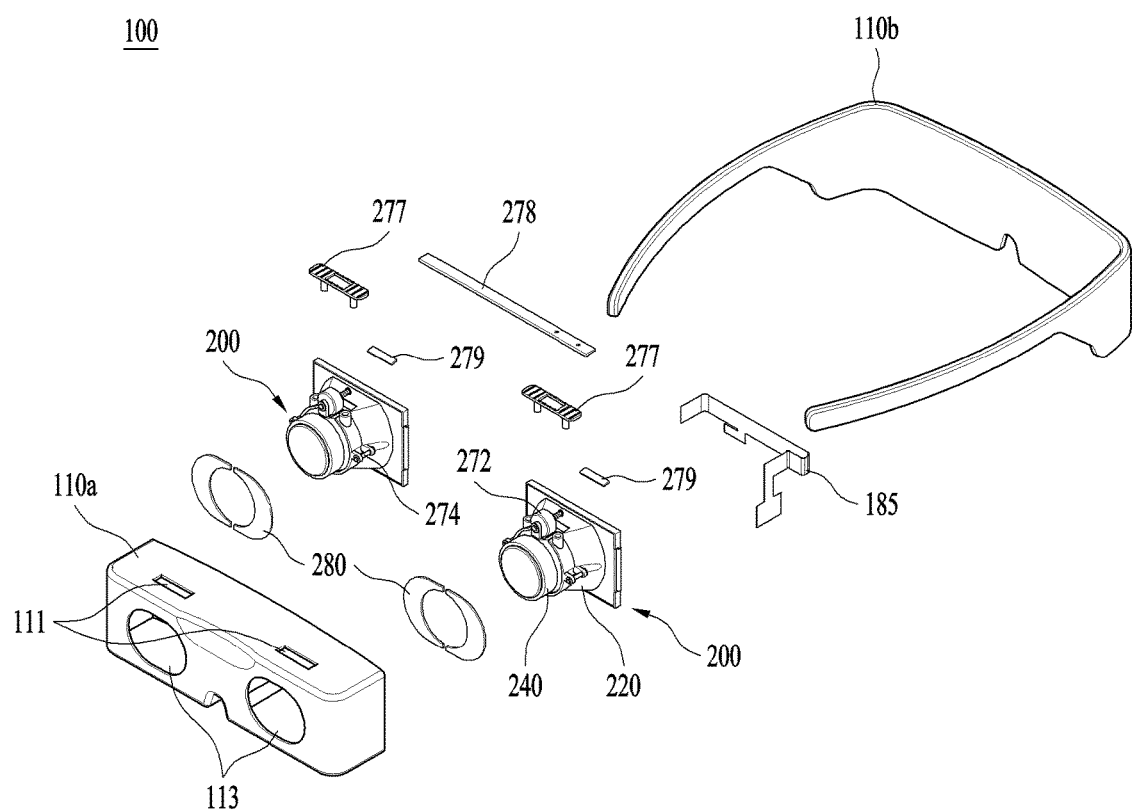
FIG. 15 is an exploded perspective diagram of the head mount display device.

FIGS. 13 and 14 are perspective diagrams of the head mount display device 100 according to another embodiment, viewed from another side. FIG. 15 is an exploded perspective diagram of the head mount display device 100. Referring to FIG. 15, the head mount display device 100 includes a housing 110, a head fixing unit 130 for fixing the housing 110 to the user's head, and a pair of optic modules 200 for providing the images to the user's right and left eyes, respectively.

The housing 110 is provided in front of the user's eyes and a front side of the housing 110 may include a plane surface or a curved surface. A back side may include a curved surface bent, corresponding to the shape of the user's face. The housing 110 has a similar appearance to goggles. The front side of the housing 110 is closed and an opening 113 is formed in the back side of the housing 110. The optic module 200 may be inserted in the opening 113.

Diverse components are mounted in the housing 110. The housing 110 may include a first case 110a arranged near the user's eyes and a second case 110b coupled to the first case 110a and arranged in the front side of the housing 110. The second case 110b may be integrally formed with the eyeglass temple unit 130 for securing the housing 110 to the user's face.

The first case 110a and the second case 110b of the housing 110 may be injection-molded, using synthetic resin or metal, e.g., stainless steel (STS) and aluminum (Al), titanium (Ti). One material or different materials may be used in forming the cases.

A pair of openings 113 may be formed in the first case and a pair of optic modules 200 may be exposed via the pair of the openings 113. The first case 110a may further include a nose support 116 to fix the housing 110 corresponding to the location of the user's eyes. A conventional nose support 116 supports both sides of the user's nose. However, the first case may further include a nose pad 115 having a V-shape surrounding sides and a top of the nose to disperse the weight applied to the user's nose. The nose pad 115 may be formed of a flexible material to reduce the load applied to the nose.

The head fixing unit for fixing the housing 110 to the user's head may be provided as a band with elasticity or an eyeglass temple unit 130 shown in FIGS. 13 and 14. The eyeglass temple unit 130 may be connected to the housing via a hinge or formed of a flexible material so that the user may widen and wear the eyeglass temple unit. Ends of the eyeglass temple units 130 are coupled to each other to surround the head as a housing ring.

The user's ears are located under the eyeglass temple units 130, only to prevent the head mount display device 100 from falling down. The housing 110 has a predetermined weight and the eyeglass temple unit 130 may be bending to surround the back of the user's head to secure the housing 110 to the head firmly. A material with elasticity may be provided in an inner surface of the eyeglass temple unit 130 and in close contact with the head to improve the frictional force and to reduce the inconvenience given to the user during the wearing.

The interface unit 160 is configured to connect the head mount display device to an external terminal to transmit and receive a signal or to supply the electric power. The interface unit 160 may be provided in the housing 110 or the eyeglass temple unit 130. When the interface unit 160 is provided in the housing 110, the signal wire may be short advantageously. If the interface unit 160 is provided in the eyeglass temple unit 130, the cable connected to the interface unit 160 could touch the face and the user could feel uncomfortable. The interface unit 160 may be provided in the eyeglass temple unit to prevent the head mount display device from lurching forward.

As shown in FIG. 15 which is an exploded perspective diagram of the optic module, the optic module 200 includes a display unit 210, a display frame 220, barrel 240 and a lens 250. The display unit 210 outputs the image supplied to the user's eye. The two independent optic modules 200 are provided. The optic module 200 provided in a left portion provides an image for the left eye and the other optic module 200 provided in a right portion provides an image for the right eye, so that 4D image can be realized, even without a complicated polarization structure or a barrier.

The display frame 220 may include a display plate 230 arranged behind the display and coupled to the display unit 2100, to improve the force for supporting the display 210. The display unit 210 may be fixedly disposed between the display frame 220 and the display plate 230.

The display plate 230 supports the back side of the display unit 210 and it has a flat shape. The display frame 220 supports the display unit 210 and fix the lens 250 at the same time. Accordingly, the display frame 220 includes a barrel accommodating part 225 formed in a cylindrical shape.

The barrel 240 is formed of a cylindrical-shaped material and receives at least one lens 250. The barrel 240 has a predetermined portion inserted in the barrel accommodating part 225 of the display frame and the other portion exposed via an opening 113 provided in the rear surface of the housing 110.

Figure 17:
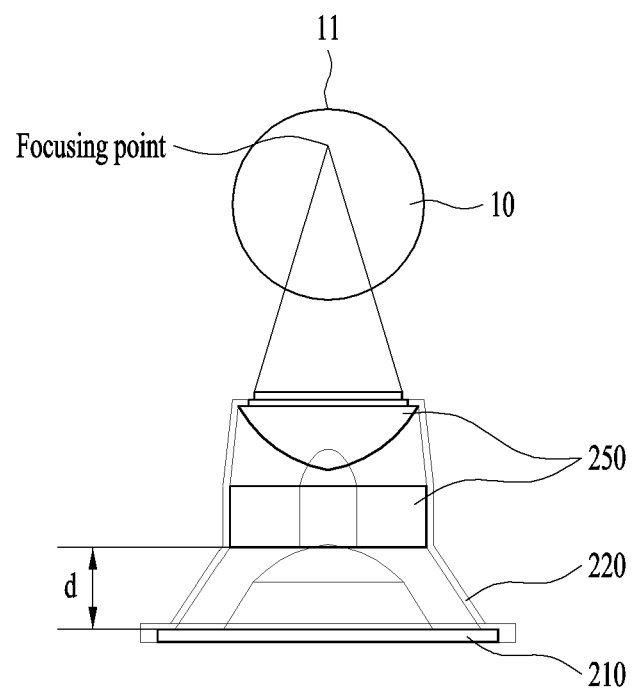
FIG. 17 is a diagram illustrating the principle of the focus adjusting in the head mount display device.

FIG. 17 is a diagram illustrating the principle of the focus adjusting in the head mount display device 100. The distance between the display unit 210 and the user's eyes is substantially short and the lens 250 is configured to adjust the location of the image output from the display unit 210 to be in a focal distance. As each user has different eyesight, each focal distance for each user is different. When the user is short-sighted, the image is becomes focused in front of the retina as shown in FIG. 17. In this instance, the focal distance has to be increased enough to focus the image on the retina so that the user can view the clear image.

When the distance (d) between the lens 250 and the display unit 210 is adjusted, the focal distance can be changed. The location of the display unit 210 is changed in the conventional head mount display device 100 and the focal distance is adjusted. The display units are integrally formed with each other and it is difficult to perform independent focus adjustment for the left eye and the right eye. To solve such disadvantage, the head mount display device 100 in accordance with the embodiments of the present disclosure adjust the distance between the lens 250 and the display unit 210, using the focus adjusting unit 227 and 247.

Figure 18:
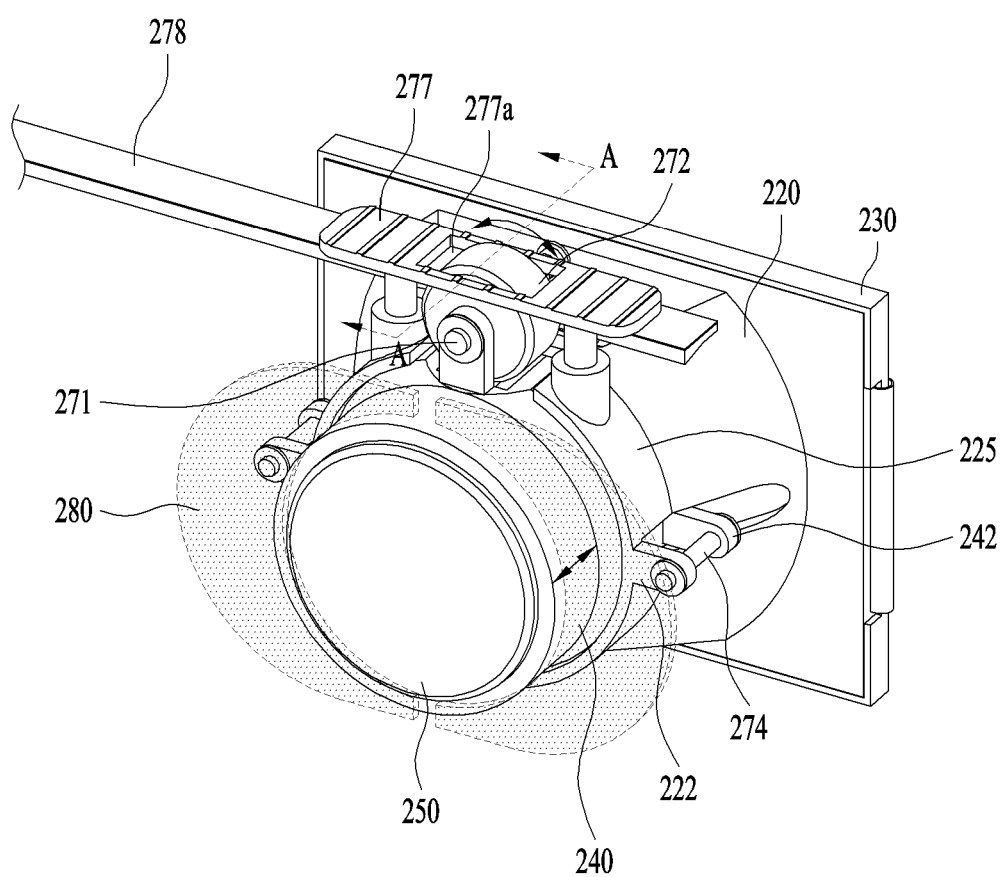
FIG. 18 is a perspective diagram illustrating an optic module, a horizontal adjusting unit and a focus adjusting unit provided in the head mount display device.
Figure 19:
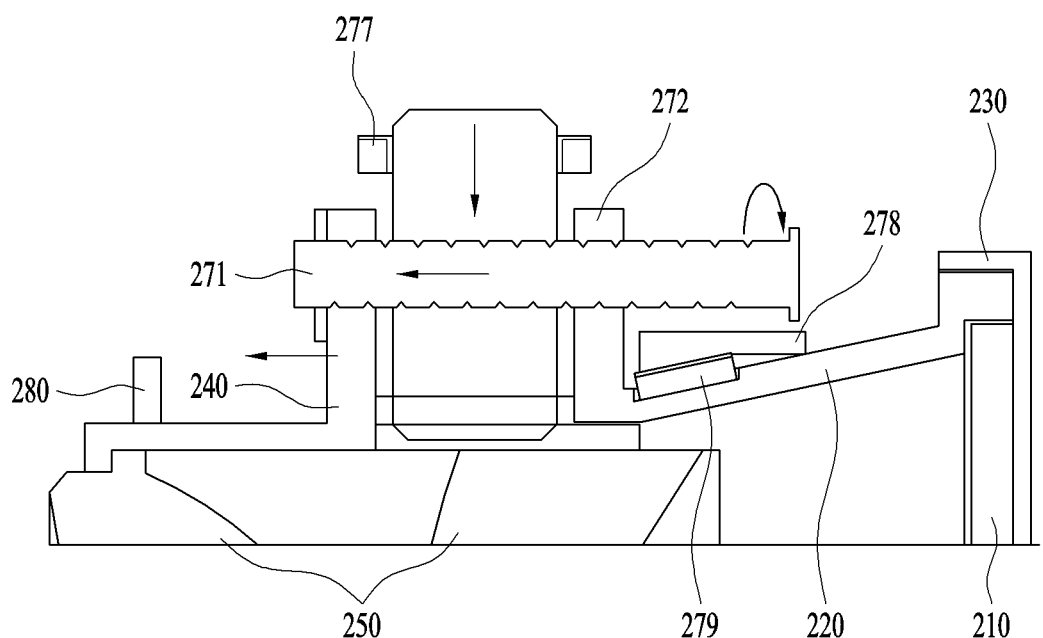
FIG. 19 is a sectional diagram along A-A of FIG. 18.

FIG. 18 is a perspective diagram illustrating the optic module 200, the horizontal adjusting unit and the focus adjusting unit provided in the head mount display device 100. FIG. 19 is a sectional diagram along A-A of FIG. 18. The barrel 240 is inserted in the barrel accommodating part 225 of the display frame 220. The focus adjusting unit moves the barrel 240 back and forth in the barrel accommodating part 225 and adjusts the distance between the lens 250 arranged in the barrel 240 and the display unit 210 fixed to the display frame 220.

The focus adjusting unit in accordance with the present disclosure includes a screw 271 rotatably secured to one of the display frame 220 and the barrel 240 and inserted in a screw hole formed in the other one to move along the screw hole. In FIGS. 18 and 19, the screw 271 is secured to the barrel 240 and the screw hole is formed in the display frame 220. Alternatively, the screw may be secured to the display frame 220 and the screw hole may be formed in the barrel 240.

A screw thread is formed in an outer surface of the screw 271 and a screw groove corresponding to the screw thread is formed in an inner surface of the screw hole. Once the user rotates the screw 271, the screw thread of the screw 271 is moved along the screw groove and the screw 271 is moved forward and backward. The barrel 240 secured to the screw 271 is moved in the barrel accommodating part 225 forward and backward.

A disc-shaped wheel 272 rotatable about the screw 271 may be used so as to facilitate the rotation of the screw 271. One side of the wheel 272 is exposed outside the housing 110 as shown in FIGS. 13 and 14. The user pushes the wheel 272 exposed outside the housing 110 leftward and rightward and rotates the screw 271. FIG. 19 (a) illustrates the barrel 240 arranged forward and (b) illustrates the barrel 240 arranged backward. As shown in FIG. 19, the barrel 240 is movable inward and outward with respect to the barrel accommodating part 225 by the screw 271.

To prevent the rotation of the screw 271 unintended by the user, the screw 271 may be formed of a metallic material. A magnet 279 may be provided adjacent to the screw 271 as shown in FIG. 19. The magnetic force of the magnet 279 may not allow the screw 271 to move easily. Only when the user applies a predetermined force or more to the screw 271, the screw 271 may move.

The screw 271 is secured to one side of the barrel 240. Accordingly, the screw 271 may use a guide shaft 274 and a guide hole to control the barrel 240 moved in the barrel accommodating part 225 forward and backward stably by the rotation of the screw 271, without being rotated in the barrel accommodating part 225. The guide shaft 274 is inserted in a first guide hole 242 formed in the barrel 240 and a second guide hole 222 formed in the display frame 220. The guide shaft 274 is extended forward and backward in parallel with the screw 271.

When moved forward and backward during the rotation of the screw 271, the barrel 240 may be moved along the first guide hole 242 and the second guide hole 222. When it is provided toward the front side as shown in FIG. 18, the first guide hole 242 restricts the moving distance of the barrel 240 toward the back side. In other words, when the first guide hole 242 contacts with the second guide hole 222, the barrel 240 may not move any further. A gasket secured to an end of the guide shaft 274 restricts the distance between the first guide hole 242 and the second guide hole 222, to prevent the barrel 240 from moving forward so far to contact with the display unit 210.

Figure 20:
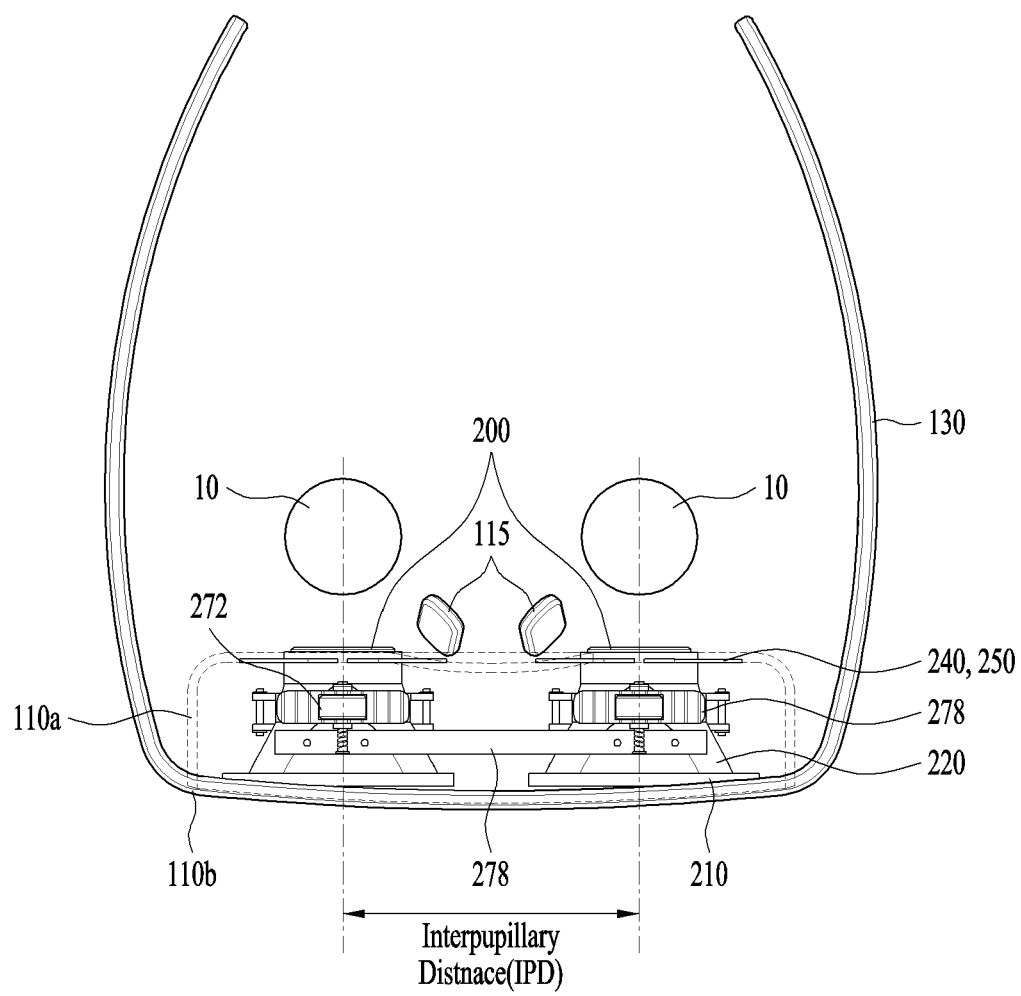
FIG. 20 is a diagram to describe the location relation between the head mount display device and the user's eyes.

FIG. 20 is a diagram to describe the location relation between the head mount display device 100 and the user's eyes. The distance between the two optic modules 200 has to be adjusted according to the distance between the eyes, in other words, interpupillary distance (hereinafter, IPD) as well as the focal distance between the device and the user's eyes. To realize the 3D image, the images photographed by two different cameras are provided to the left eye and the right eye, respectively, to allow the user to recognize the images dimensionally. Accordingly, the positions of the pupils have to be in concordance with the center of the image sharply to provide the 3D image.

It is necessary to provide a horizontal adjusting unit which adjust the distance between the optic modules 200, corresponding to the user's pupils. The distance to the left eye from the user's nose is different from the distance to the right eye, the horizontal adjusting unit moving the left and right optic modules 200 independently may locate the optic modules 200 in concordance with the pupils precisely, compared with the horizontal adjusting unit moving the left and right optic modules 200 symmetrically. The lenses 250 and the display units 210 of the optic module 200 in accordance with the present disclosure are divided for the left eye and the right eye, respectively, and they may move independently. Accordingly, the optic modules 200 may be arranged in concordance with the pupils.

Figure 21:
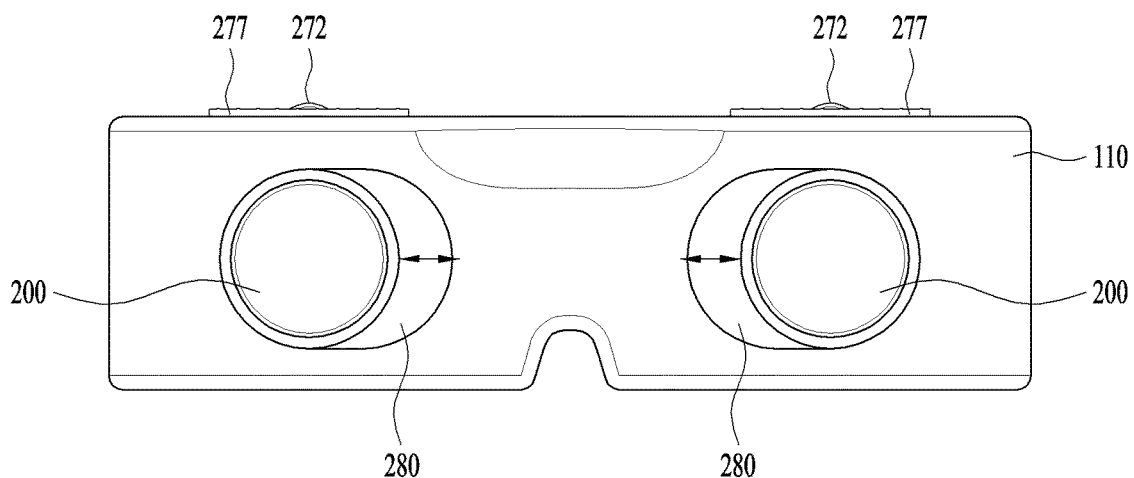
FIG. 21 is a diagram to describe the operation of the horizontal adjusting unit provided in the head mount display device.

FIG. 21 is a diagram to describe the operation of the horizontal adjusting unit provided in the head mount display device 100. As shown in FIG. 21, the right and left positions of the optic modules is adjusted and the distance between the user's eyes may be adjusted. The right and left optic modules 200 may be moved independently. Even when the distance to one eye from the nose is different from the distance to the other eye from the nose, the right and left optic modules may be adjusted to the proper positions.

Figure 16:
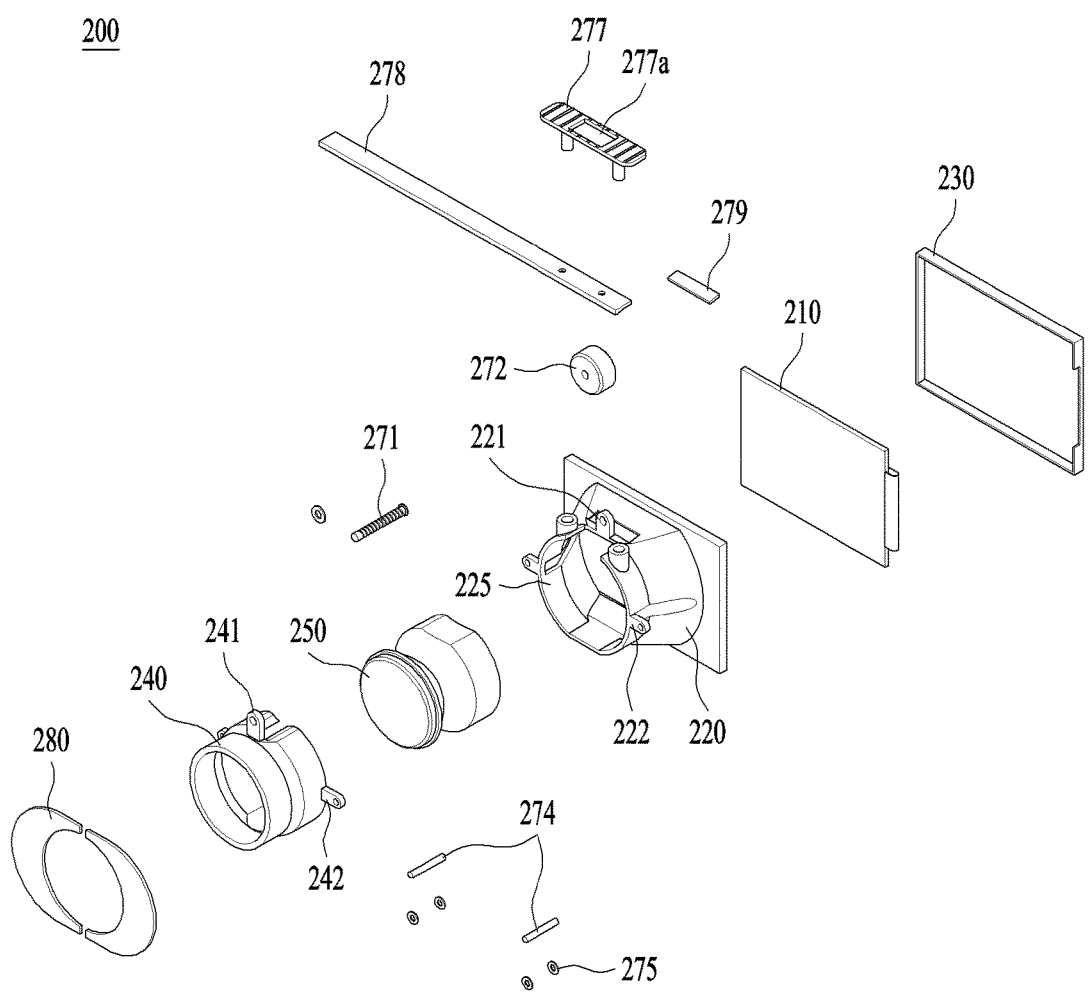
FIG. 16 is an exploded perspective diagram of the optic module of the head mount display device.

The barrel 240 and the lens of the optic module 200 have to be exposed to the back side of the housing 110. For that, the opening 113 may be formed in the housing 110 and longitudinally extended in a right and left direction for the right and left direction of the optic module. As shown in FIG. 15, a spacer 280 corresponding to the opening 113 of the barrel 240 may be provided to prevent the internal components of the housing 110 from being visible through the opening 113. When the barrel 240 has the cylindrical shape as shown in FIG. 16, the opening 113 may have an oval shape and the spacer 280 may have a crescent shape.

Figure 22:
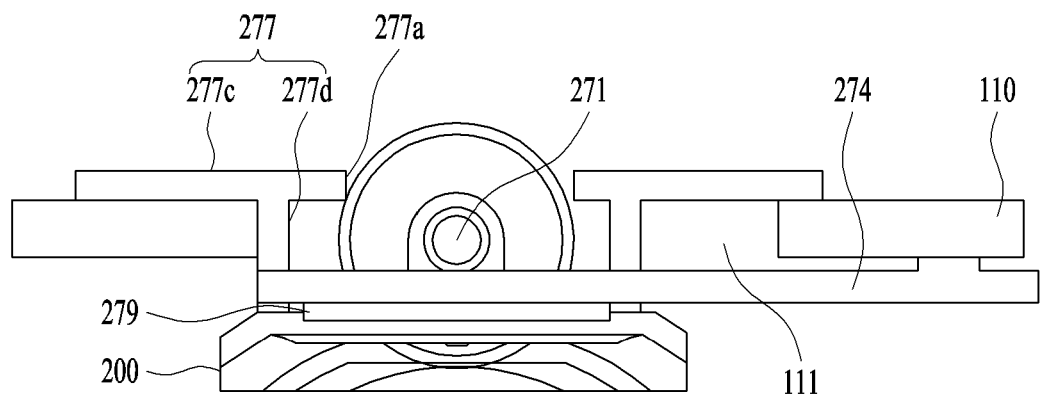
FIG. 22 is a diagram illustrating a cross section of a wheel and a horizontal adjusting button shown in FIG. 21.
Figure 22:
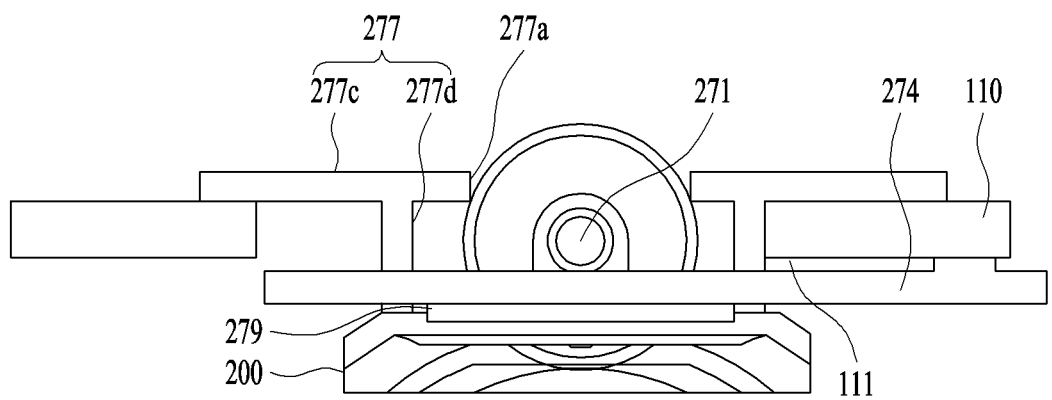

FIG. 22 is a diagram illustrating a cross section of the wheel 272 and the horizontal adjusting button 277 shown in FIG. 21. The horizontal adjusting button 277 includes a button 277c provided in an outer surface of the housing 110 and a coupling pole 277d extended from the button 277c via a button opening 111 formed in the housing 110. The coupling pole 277d is coupled to the optic module 200. When the horizontal adjusting button 277 is moved rightward and leftward as shown in FIG. 22, the optic module is relatively moved with respect to the housing 110 rightward and leftward.

The button opening 111 formed in the housing 110 may be larger than the coupling pole 277d or the distance between the coupling poles 277d in case two or more coupling poles are provided. When the coupling pole 277d contacts with an end of the button opening 111, the rightward and leftward movement of the coupling pole 277d is restricted. The button 277c may be formed larger than the button opening 111 to prevent the button opening 111 from being exposed outside even when the horizontal adjusting button 277 is moved rightward and leftward.

A rail 278 may be further provided to prevent the shaking of the optic module moved rightward and leftward. Referring to FIG. 15, the rail 278 is fixed to the housing 110 as a bar extended along a right and left direction. As shown in FIG. 19, the rail 278 may be inserted in the optic module 200 in the right and left direction. A groove may be formed in the optic module 200 or the rail 278 may be disposed between the screw 271 and the display frame 220 as shown in FIG. 19.

The optic module 200 is movable rightward and leftward along the rail 278. At this time, a magnet 279 may be used in preventing the moving of the optic module 200 without user intention. The user has to apply the force stronger than the magnetic force of the magnet or more to move the optic module 200 along the rail 278. The magnet 279 for restricting the rotation of the screw mentioned above may be used as the magnet for restricting the moving of the optic module along the rail. In other words, one magnet 279 is arranged near the screw and the rail 278 only to restrict the horizontal movement of the optic module 200 and the forward and backward movement of the barrel 240.

Alternatively, a stopping groove (not shown) corresponding to the screw 271 may be formed in the rail 278 and the screw 271 may be stopped in the stopping groove. Only when a predetermined force or more is applied to the screw 271, the horizontal movement may be performed.

When a plate spring is used as the stopping groove, the elasticity allows the plate spring to be deformed when the user tries to move the optic module. A projection may be formed in a top of the horizontal adjusting button 277. When the user presses and moves the horizontal adjusting button 277, the friction force between the user's finger and the horizontal adjusting unit 277 may increase.

A wheel opening 277a may be further provided in the horizontal adjusting button 277 to expose the wheel 272 of the focus adjusting unit mentioned above. The user may adjust the right and left position of the optic modules 200 and the distance between the lenses 250 and the display units 210 according to IPD, using the wheel 272 and the horizontal adjusting button 277 provided in the same position while the number of the buttons exposed outside is minimized.

According to at least one embodiment mentioned above, the focus distance may be adjusted according to the user's eyesight. The horizontal adjusting unit is provided to make the distance between the lenses 250 in concord with IPD (Interpupillary Distance). The user may enjoy 3D image more comfortably.

Especially, the left eye optic module 200 and the right eye optic module 200 may be independently controlled in the head mount display device 100 in accordance with the present disclosure. Even the user with different right eye sight and left eye sight may adjust the focus and the distance between the eyes and the nose.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A head mount display device comprising:
    a housing comprising a closed front side and a back side having a pair of openings;
    a pair of optic modules arranged horizontally behind the front side in the pair of openings, each optic module including:
        a display provided in the housing;
        a barrel having one end arranged in the housing and an opposite end exposed outside the housing via the opening;
        a lens fixed to the barrel;
        a focus adjuster configured to adjust a distance between the barrel and the display; and
        a horizontal adjuster configured to guide horizontal movement of the optic module with respect to the housing; and a display frame coupled to the back side of the display, the display frame including a barrel accommodating part configured to surround a circumference of the barrel; and a head fixing unit configured to fix the housing to a user's head, wherein the focus adjuster and the horizontal adjuster provided in one optic module of the pair of optic modules is operable independently from the focus adjuster and the horizontal adjuster provided in the other optical module in the pair of optic modules, and wherein the focus adjuster changes a position of the barrel arranged in the barrel accommodating part.

2. The head mount display device of claim 1, wherein the focus adjuster comprises:

a screw thread formed in the circumference of the barrel; and a screw groove formed in the barrel accommodating part, the screw groove corresponding to the screw thread.

3. The head mount display device of claim 2, further comprising at least one friction groove formed in the circumference of the barrel, the at least one friction groove being spaced from the screw thread.

4. The head mount display device of claim 1, wherein the horizontal adjuster comprises:

a coupling portion formed in the optic module, the coupling portion having a fixing hole; and a slide shaft having opposite ends coupled to the housing, the slide shaft extending horizontally through the fixing hole, and wherein, when the optic module is moved horizontally, the coupling portion moves along the slide shaft.

5. The head mount display device of claim 4, wherein the coupling portion comprises:

a first coupling portion arranged at a top of the optic module;

a second coupling portion arranged at a bottom of the optic module;

a first fixing hole formed in the first coupling portion that is equal to the cross section of the slide shaft; and a second fixing hole formed in the second coupling portion that is longer than the cross section of the slide shaft.

6. The head mount display device of claim 4, wherein the coupling portion further comprises a friction member in the fixing hole, the friction member being configured to increase contact friction with respect to the slide shaft.

7. The head mount display device of claim 1, wherein each opening of the pair of openings formed in the housing extends along an axis of the respective barrel and is longer than the respective barrel.

8. The head mount display device of claim 1, wherein the focus adjuster comprises:

a screw having one side rotatably fixed to one of the display frame and the barrel and inserted in a screw groove formed in the other of the display frame and the barrel; and a wheel coupled to an outer circumference of the screw, wherein, when rotating the wheel, the screw is movable inward and outward with respect to the screw hole to adjust the position of the barrel.

9. The head mount display device of claim 8, further comprising a magnet arranged adjacent to the screw.

10. The head mount display device of claim 8, further comprising:

a first guide hole formed in the barrel;

a second guide hole formed in the display frame; and a guide shaft extending parallel to the screw through the first guide hole and the second guide hole, wherein the first guide hole or the second guide hole moves along the guide shaft when the barrel moves.

11. The head mount display device of claim 10, wherein the first guide hole is located between the front side of the housing and the second guide hole.

12. The head mount display device of claim 1, wherein the horizontal adjuster comprises a rail fixed to the housing, the rail extending horizontally, and wherein the optic module is connected to the rail and moves horizontally along the rail.

13. The head mount display device of claim 12, further comprising a magnet provided in the optic module, the magnet being arranged to be adjacent to the rail.

14. The head mount display device of claim 12, wherein the focus adjuster comprises:

a screw having one side rotatably fixed to one of the display frame and the barrel and inserted in a screw groove formed in the other of the display frame and the barrel; and a wheel coupled to an outer circumference of the screw, wherein, when rotating the wheel, the screw is movable inward and outward with respect to the screw hole to adjust the position of the barrel.

15. The head mount display device of claim 14, wherein the horizontal adjuster comprises:

a button exposed outside the housing; and a coupling pole extending from the button, the coupling pole being coupled to the optic module through a button opening formed in the housing, the button opening extending horizontally.

16. The head mount display device of claim 15, wherein the button includes a wheel opening exposing one side of the wheel therethrough.

17. The head mount display device of claim 16, further comprising a pair of spacers coupled to right and left sides of the barrel, respectively, and equal to or longer than a diameter of the barrel and a difference between the right and left lengths of the opening, wherein the spacers cover the wheel opening.

18. The head mount display device of claim 1, further comprising a main board provided between the optic modules and configured to receive an image signal from an external device to provide the image signal to the displays of the optic modules, wherein each optic module includes:

a display driver coupled to one end of the display and configured to control pixels of the display according to the signal transmitted from the main board; and a connecting portion configured to connect the main board to the display, and wherein the display drivers of the optical modules are symmetrically arranged in the housing.

19. The head mount display device of claim 18, wherein the connecting portion is arranged vertically in a center of the main board.

20. The head mount display device of claim 18, wherein the connecting portion comprises a flexible material.

21. The head mount display device of claim 18, further comprising:

an interface provided in a predetermined portion of the housing or the head fixing unit, the interface being connectable to an external terminal; and a flexible board configured to connect the interface unit to the main board.

22. The head mount display device of claim 1, claim 18, wherein the main board is arranged in a different plane surface from the displays and partially overlap the displays.

23. The head mount display device of claim 1, wherein the head fixing unit further comprises an eyeglass temple unit coupled to right and left ends of the housing to be supported by the user's ears; and
   a cushion arranged on an inner surface of each of the eyeglass temple units.

24. The head mount display device of claim 1, further comprising a hood unit provided between the housing and the user's face, the hood unit being configured to block external light when the head mount display device is worn.

25. The head mount display device of claim 1, further comprising:
   a proximity sensor arranged in a center of the back side of the housing; and
   a controller configured to control the displays when sensing an object coming close to the proximity sensor.

26. The head mount display device of claim 1, further comprising:
   a gyro sensor configured to sense variation of the housing direction;
   a hold button exposed outside the housing; and
   a main board configured to control the displays to output different images according to the direction sensed by the gyro sensor except when a hold signal is generated from the hold button.

27. The head mount display device of claim 1, further comprising a nose pad projected between the pair of the optic modules to be placed on the user's nose, the nose pad having a V-shape so as to cover a top and both sides of the nose.

* * * * *